US005729554A

United States Patent [19]

Weir et al.

[11] Patent Number: 5,729,554
[45] Date of Patent: Mar. 17, 1998

[54] SPECULATIVE EXECUTION OF TEST PATTERNS IN A RANDOM TEST GENERATOR

[75] Inventors: Duncan Weir; Russell C. Brockmann, both of Fort Collins, Colo.

[73] Assignee: Hewlett-Packard Co., Palo Alto, Calif.

[21] Appl. No.: 720,604

[22] Filed: Oct. 1, 1996

[51] Int. Cl.$^6$ .................................................. G06F 11/00
[52] U.S. Cl. ........................................ 371/27; 395/183.07
[58] Field of Search ..................... 371/27, 20.4, 25.1; 364/488, 578; 395/183.01, 183.03, 183.04, 183.06, 183.07

[56] References Cited

U.S. PATENT DOCUMENTS 5,202,889   4/1993   Aharon et al. .

OTHER PUBLICATIONS

D. Magenheimer, The HP Precision Simulator, Hewlett-Packard Journal, vol. 37, No. 8 Aug., 1986, pp. 40–43.

Kohlhardt, Gaddis, et. al., Design, Verification, and Test Methodology for a VLSI Chip Set, Hewlett-Packard Journal, vol. 38, No. 9, Sep. 1987, pp. 18–26.

Aharon et. al., Verification of the IBM RISC System–6000 by a dynamic biased pseudo–random test program generator IBM Systems Journal, vol. 30, No. 4, 1991, pp. 527–538.

D. Weir et al., Random Code Generator, to be published in the Hewlett–Packard Journal in Jan./Feb. 1997 issue.

*Primary Examiner*—Vincent P. Canney

[57] ABSTRACT

Presented is a computer-based test system and method for generating and improving the effectiveness of test cases for a model or an implementation of a computer architecture. The system includes an architectural model configured to model the requirements of the computer architecture and a behavior model configured to model the implementation of the computer architecture, wherein the behavioral model is designed to conform with the computer architecture. Further included is a simulator configured to simulate the operation of the behavioral model in response to a test pattern and to provide a behavioral model state. A random test generator is configured to test aspects of the architectural model and to generate and provide test patterns to the simulator according to the behavioral model state provided by the simulator. The random test generator provides the ability to store a pre-simulation behavioral model state and reset the simulator to the pre-simulation behavioral model state at a later time. The system may further include a history of previous events from which the rate at which an event occurs may be controlled.

10 Claims, 8 Drawing Sheets

ADD

FORMAT: ADD, COND R1, R2, T

OPERATION: GR[T] <-- GR[R1] + GR[R2];
PSW[C/B] <-- CARRY/BORROW;
IF (COND_SATISFIED) PSW[N] <-- 1;

CONDITIONS:

| COND | VALUE | DESCRIPTION |
|------|-------|-------------|
|      | 1     | NEVER |
| =    | 2     | GR[R1] IS EQUAL TO NEGATIVE OF GR[R2] |
| <    | 3     | GR[R1] IS LESS THAN NEGATIVE OF GR[R2] (SIGNED) |
| <=   | 4     | GR[R1] IS LESS THAN OR EQUAL TO NEGATIVE OF GR[R2](SIGNED) |
| NUV  | 5     | GR[R1] PLUS GR[R2] DOES NOT OVERFLOW (UNSIGNED) |
| ZNV  | 6     | GR[R1] PLUS GR[R2] IS ZERO OR NO OVERFLOW (UNSIGNED) |
| SV   | 7     | GR[R1] PLUS GR[R2] OVERFLOWS (SIGNED) |
| OD   | 8     | GR[R1] PLUS GR[R2] IS ODD |
| TR   | 9     | ALWAYS |
| <>   | 10    | GR[R1] IS NOT EQUAL TO NEGATIVE OF GR[R2] |
| >=   | 11    | GR[R1] IS GREATER THAN OR EQUAL TO NEGATIVE OF GR[R2] (SIGNED) |
| >    | 12    | GR[R1] IS GREATER THAN NEGATIVE OF GR[R2] (SIGNED) |
| UV   | 13    | GR[R1] PLUS GR[R2] OVERFLOWS (UNSIGNED) |
| VNZ  | 14    | GR[R1] PLUS GR[R2] IS NONZERO AND OVERFLOWS (UNSIGNED) |
| NSV  | 15    | GR[R1] PLUS GR[R2] DOES NOT OVERFLOW (SIGNED) |
| EV   | 16    | GR[R1] PLUS GR[R2] IS EVEN |

FIG. 5

STW

FORMAT: STW R, ADDR

OPERATION: ADDR <-- GR[R] ;

EXCEPTIONS: TLB MISS;
MEMORY ACCESS RIGHTS VIOLATION;
MEMORY PROTECTION ID VIOLATION;
UNALIGNED DATA REFERENCE VIOLATION;
TLB DIRTY BIT TRAP

FIG. 6

COMBT

FORMAT: COMBT COND R1, R2, T

OPERATION: GR[R1] + (-GR[R2] + 1);
IF (COND_SATISFIED)
    INSTRUCTION POINTER = T.

CONDITIONS:

| COND | VALUE | DESCRIPTION |
|---|---|---|
|  | 1 | NEVER |
| = | 2 | GR[R1] IS EQUAL TO NEGATIVE OF GR[R2] |
| < | 3 | GR[R1] IS LESS THAN NEGATIVE OF GR[R2] (SIGNED) |
| <= | 4 | GR[R1] IS LESS THAN OR EQUAL TO NEGATIVE OF GR[R2] (SIGNED) |
| NUV | 5 | GR[R1] PLUS GR[R2] DOES NOT OVERFLOW (UNSIGNED) |
| ZNV | 6 | GR[R1] PLUS GR[R2] IS ZERO OR NO OVERFLOW (UNSIGNED) |
| SV | 7 | GR[R1] PLUS GR[R2] OVERFLOWS (SIGNED) |
| OD | 8 | GR[R1] PLUS GR[R2] IS ODD |
| TR | 9 | ALWAYS |
| <> | 10 | GR[R1] IS NOT EQUAL TO NEGATIVE OF GR[R2] |
| >= | 11 | GR[R1] IS GREATER THAN OR EQUAL TO NEGATIVE OF GR[R2] (SIGNED) |
| > | 12 | GR[R1] IS GREATER THAN NEGATIVE OF GR[R2] (SIGNED) |
| UV | 13 | GR[R1] PLUS GR[R2] OVERFLOWS (UNSIGNED) |
| VNZ | 14 | GR[R1] PLUS GR[R2] IS NONZERO AND OVERFLOWS (UNSIGNED) |
| NSV | 15 | GR[R1] PLUS GR[R2] DOES NOT OVERFLOW (SIGNED) |
| EV | 16 | GR[R1] PLUS GR[R2] IS EVEN |

SPECULATIVE EXECUTION OF TEST PATTERNS IN A RANDOM TEST GENERATOR

FIELD OF THE INVENTION

The present invention relates generally to random test generation for testing the operation of an integrated circuit design, and more particularly, to a system and method for improving the ability of a random test generator to produce effective cases by speculatively executing a test pattern to see if the events created by the test pattern are useful or whether a different test pattern should be created instead.

BACKGROUND OF THE INVENTION

Random testing and the microprocessor variant called random code generation has been used extensively to exercise and verify the correctness of complex designs. A key aspect of all random testing is to use a pseudo-random number generator to assist in creating stimulus to exercise the design. The usefulness of a random test generator is directly related to the quality of test cases produced (measured by how effective those test cases are at testing the design).

Prior art random code generation designs have used rules to constrain the amount of randomness used in the testing to avoid illegal cases and to focus the cases on interesting aspects of the design. Purely random testing produces too many illegal cases and does not stress complex designs thoroughly enough to be of real value.

Prior art random test generators have been built to focus the testing of a computer architecture by incorporating rules of constraint. Rules of constraint attempt to keep the machine state within acceptable bounds where useful testing can occur. As an example, a rule of constraint might require that a valid processor virtual address exist in a register in order to guarantee that loads and stores using that register are from or to a legal memory location. Random test generators rely on the principle that if a valid machine state exists before executing a test vector and the rules of constraint are followed in generating the test vector, a valid machine state will exist after the test vector is executed.

Random test generators built using rules of constraint suffer from several disadvantages. First, rules of constraint result in performance inefficiencies. For example, a rule of constraint might provide that only address registers contain valid memory space addresses. During testing a scratch register may contain a valid memory space address but the random test generator cannot take advantage of that fact. The random test generator cannot know the actual value of the contents of a scratch register, since according to the rules of constraint, scratch registers may contain any value and are not limited to containing a valid memory space address value.

Another disadvantage suffered by random test generators built on rules of constraint is that they can prevent some interactions that expose design flaws. Accordingly, in rule-based random test generators there is a design trade-off between having rules which prevent illegal conditions and which focus the cases on specific design features versus not having rules so that more generalized interactions can occur.

Random code generation may be improved if the state of the machine is known before each new instruction is created. For example, it can allow precise control over instruction trapping (e.g., interrupts caused by error conditions such as divide-by-zero, status conditions such as resource-unavailable). Knowing the state of the machine prior to generating a test vector allows precise control over whether the machine traps because the random test generator knows what conditions cause it to trap (e.g., it can predict whether it is dividing by zero). Accordingly, knowing the machine state allows the random test generator to cause traps to happen or cause them not to happen.

Knowing the state of the machine prior to generating the next test vector also allows the random test generator to take advantage of the machine state in generating the next test vector. For example, in the above illustration, a scratch register may contain a valid address but the rule-based random test generator would not generate a next test vector which requires a register containing a valid memory space address to utilize the scratch register because it violates the rules of constraint. If the random test generator has the ability to know the machine state prior to generating the next test vector, the random test generator may simply search the entire register file to determine which registers have a valid memory space address and use it as an address no matter how it got there. As another example, a random test generator which knows the machine state before generating the next test vector may allow instructions to be conditionally generated (e.g., certain instructions legal only in a privileged mode).

One method for providing a random test generator with knowledge of the current machine state of the computer architecture under test is to provide an integrated simulator. By integrating a machine simulator (or reference model) with the random test generator it becomes possible to simulate the behavior of a test pattern that is created. Random test generators which have integrated simulators are known in the art. For a discussion of random test generators which illustrate the principles of generating test code using an integrated simulator, see U.S. Pat. No. 5,202, 889 to Aharon et al.; Aharon et al., *Verification of the IBM RISC System/6000 by a dynamic biased pseudo-random test Program Generator*, IBM Systems Journal, Vol. 30, No. 4 (1991), pp. 527–538; and Weir et al., *Random Code Generation*, Hewlett-Packard Journal, Vol. UNKNOWN, No. UNKNOWN (1997), pp. UNKNOWN. A combination of user control, architectural specification, a pseudo-random number generator, and an integrated simulator are employed to produce test patterns that are effective at testing a complex design of a computer architecture.

However, even with the use of an integrated simulator, random test generators still suffer in terms of the quality of the test cases produced. Due to the randomness of the test code generator, many of the test patterns generated do not test interesting cases and therefore do not contribute to the usefulness of the test case. As an illustration, suppose it is deemed interesting to bypass the result of an add instruction ADD into a memory access instruction LD of an address formed using the result of the ADD instruction. The random test generator generates the ADD instruction, but since the operands are also generated in a pseudo-random manner, the result of the ADD instruction may not be able to be used to form a valid memory space address. As a result, the generation of the ADD instruction is not useful in testing the bypass into a load.

Accordingly, it is an object of the present invention to provide an efficient method for improving the ability of a random test generator to produce effective cases by speculatively executing a test pattern to see if the events created by the test pattern are useful or whether a different test pattern should be created instead.

SUMMARY OF THE INVENTION

In accordance with a preferred embodiment of the invention, there is presented an efficient method for improving the ability of a random test generator to produce effective cases by speculatively executing a test pattern. An integrated machine simulator allows a random test generator to simulate the behavior of a test pattern that it generates. After simulation, the machine state may be inspected to determine if the test pattern contributed to the usefulness of the case. If it did, then the test pattern is saved and the process repeats for generation of subsequent test patterns until enough patterns have been created. The number of test patterns in a case is controlled by the user of a random test generator. However, if after simulation and inspection of the resulting machine state it is determined that a test pattern does not provide useful testing, the test pattern is discarded and the machine state is reset to its previous state and a different test pattern is produced.

The test system includes an architectural model configured to model the requirements of the computer architecture and a behavior model configured to model the implementation of the computer architecture. The behavioral model is designed to conform with the computer architecture. The test system further includes a simulator configured to simulate the operation of the behavioral model in response to a test vector and to provide a behavioral model state. Also included is a random test generator configured to test aspects of the architectural model. The random test generator generates and provides test vectors to the simulator. The test vectors are produced according to both the current behavioral model state provided by the simulator and a set of test parameters. The random test generator has the ability to set an initial behavioral model state and to control execution of the simulator. It also has the ability to change the behavioral model state at any point in generating and running test cases. In addition, the random test generator has the ability to store a pre-simulation behavioral model state, run a test pattern sequence and determine whether the sequence tests a useful aspect of the behavioral model, and discard the test pattern sequence and reset the behavioral model state to the pre-simulation behavioral model state if it does not.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENT INVENTION

1. Description

The preferred embodiment of the present invention is discussed below with reference to the drawings, where like reference numbers represent like elements.

Figure 1:
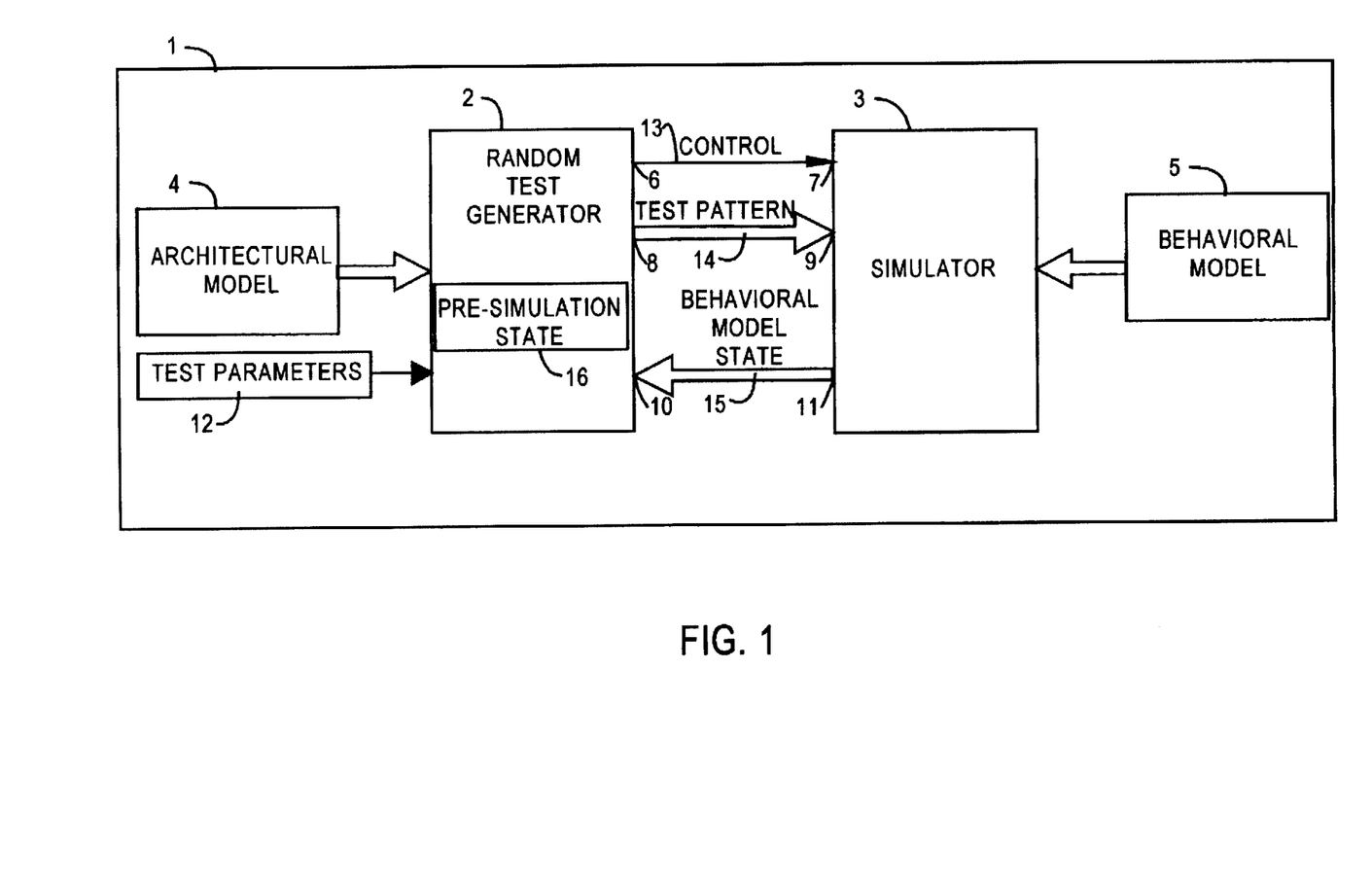
FIG. 1 is a high level system diagram illustrating the structure and interfaces of the preferred embodiment of the present invention.

FIG. 1 illustrates a preferred embodiment of the present invention. In the preferred embodiment, computer-based test system 1 is executed on a Hewlett Packard HP 700 series computer, in a UNIX environment, manufactured by Hewlett-Packard Company, Palo Alto, Calif., USA. However, the present invention can be implemented on any present or future developed computer platform utilizing any present or future developed operating system.

There are two processes in the preferred embodiment: a random test generator process executed by a random test generator 2 and a simulator process executed by an integrated simulator 3. A process is a set of instructions or routines which perform a functionally related task. The random test generator 2 generates test vectors for a computer architecture under test based on an architectural model 4 of the computer architecture under test. The architectural model 4 may be embedded within the random test generator 2, as in the preferred embodiment; a random test generator of this type may be called a "specific" or "tailored" random test generator. Alternatively, the architectural model 4 may be read into the random test generator 2, whereby the random test generator 2 has the ability to read in a multitude of different computer architectures and generate test vectors accordingly. A random test generator of this type may be called a "generic" random test generator. Architectural models are well known in the art. For a detailed description of a suitable architectural model, see D. Magenheimer, *The HP Precision Simulator,* Hewlett-Packard Journal, Vol. 37, no. 8, August, 1986, pp. 40–43, incorporated herein by reference.

The simulator 3 simulates a behavioral model 5 of the computer architecture under test and produces a behavioral model state vector. The behavioral model 5 may be embedded within the simulator 3, as in the preferred embodiment; accordingly, simulator 3 is called a "specific" or "tailored" simulator and has the ability to simulate only the behavioral model of the particular computer architecture under test. Alternatively, the behavioral model 5 may be read into the simulator 3, whereby the simulator 3 has the ability to simulate a variety of different behavioral models; accordingly, simulator 3 would be called a "generic" simulator. In the present invention, the random test generator 2 and the simulator 3 execute concurrently. Behavioral models are well known in the art. For a detailed description, see Kohlhardt, Gaddis, et. al., *Design, Verification, and Test Methodology for a VLSI Chip Set,* Hewlett-Packard Journal, Vol. 38, no. 9, September 1987, pp. 1826, incorporated herein by reference.

In the preferred embodiment, the architectural model 4 models the instruction set of the computer architecture. The architectural model includes the valid instruction set and valid machine states of the computer architecture under test. The architectural model may model other high-level requirements of a computer system, such as input/output requirements.

The random test generator 2 has an output 6 for sending control commands to the simulator 3. The random test generator 2 also has an output 8 for transmitting state information to the simulator 3. The state information may include a behavioral model state which the simulator should set the current behavioral model state to for use during initialization, or it may include test vectors generated by the random test generator for use during normal testing operation. The random test generator 2 also has an input 10 for receiving behavioral mode state information from the simulator 3. The random test generator 2 may also include an input for accepting test parameters 12. The test parameters 12 may specify such information, among other things, as the number of test vectors to generate for a test, and percentages or numbers of types of instructions to generate.

The behavioral model 5 is an implementation of a computer architecture. The behavioral model 5 may take the form of, but not be limited to, a high-level descriptive software model of how a particular hardware module functions.

The simulator 3 includes an input 7 for receiving control commands from the random test generator 2. The simulator 3 also includes an input 9 for receiving state information from the random test generator 2. The simulator 3 further includes an output 11 for transmitting the behavioral model state to the random test generator 2.

The random test generator 2 has the ability to set the current behavioral model state of the simulator, query the behavioral model state of the simulator, and control execution of simulation by the simulator 3. The random test generator 2 facilitates these actions by sending various control commands and corresponding state information at output 8 and at output 6 to the simulator 3. The simulator 3 receives control commands at input 7 and corresponding state information at input 9 and acts according to the command to set the behavioral model state, transmit the current behavioral model state at output 11, or control simulation as commanded. The random test generator 2 has the ability to store a pre-simulation behavioral model state 16, run a test pattern sequence and determine whether the sequence tests a useful aspect of the behavioral model, and discard the test pattern sequence and reset the behavioral model state to the pre-simulation behavioral model state 16 if it does not.

In operation, the random test generator 2 in general generates a random test which includes a set of test vectors to be sent to the simulator 3 for simulation. The generation of each random test includes a sequence, in order, of determining and sending an initial behavioral model state to the simulator, then sending a sequence of test vectors to the simulator for simulation, and finally receiving a final behavioral model state from the simulator for comparison to an expected final state. In order to determine the usefulness of a test pattern, the random test generator 2 stores a pre-simulation behavioral model state 16, generates a test pattern or test pattern sequence that might test an interesting aspect of the behavioral model, and causes the simulator 3 to simulate the test pattern sequence. The random test generator 2 then reads the resulting behavioral model state to determine whether the test pattern sequence results in a useful result which assists in testing a certain aspect of the behavioral model. If the resulting behavioral model state is not useful, the random test generator 2 may discard the test pattern sequence, reset the behavioral model state to the pre-simulation behavioral model state 16, and continue to generate test patterns as described until a given number of test patterns has been generated.

Figure 2:
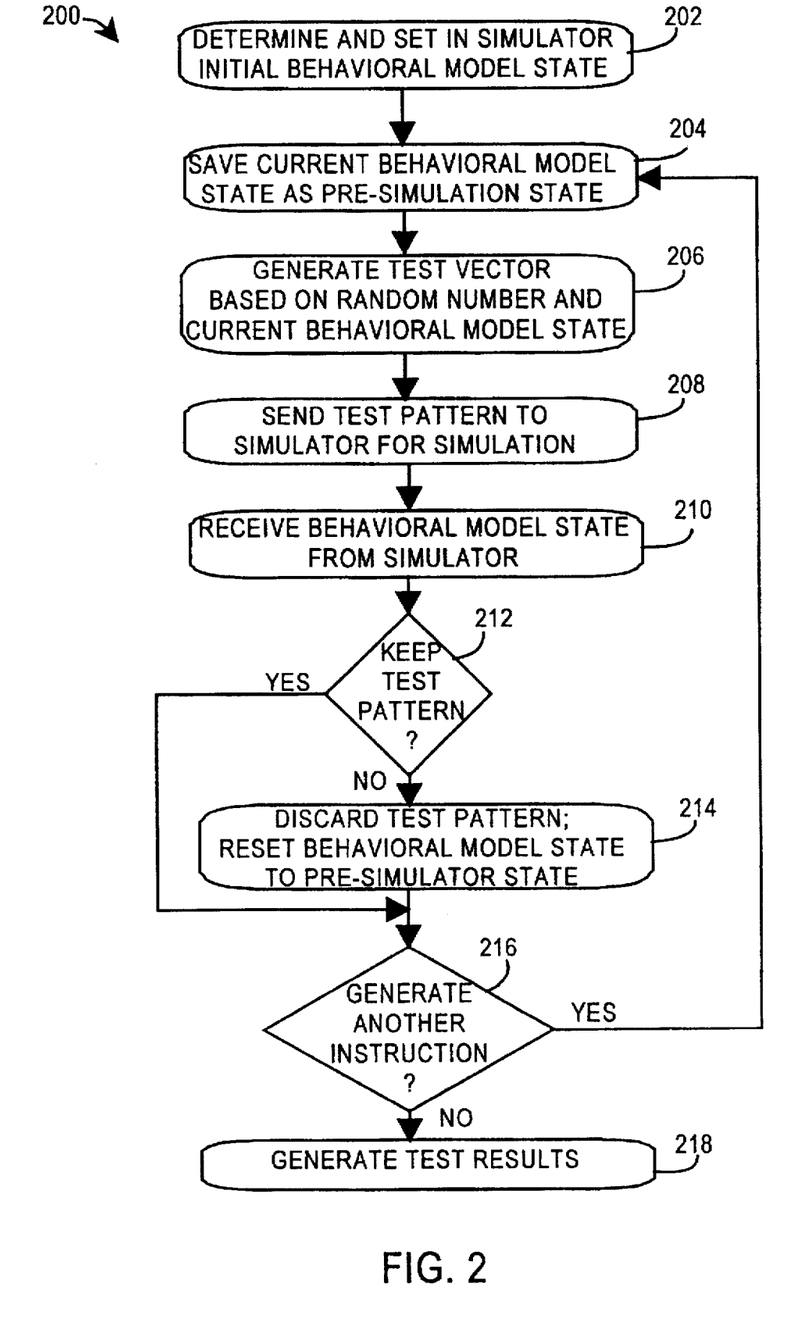
FIG. 2 is a flowchart of the sequence of operations executed by the random test generator of the preferred embodiment.

FIG. 2 is a flowchart of the sequence of operations executed by the random test generator 2 of the preferred embodiment. As shown in FIG. 2, the sequence of operations, shown generally at 200, includes a step 202 of determining an initial behavioral model state and sending a set behavioral model state command to the simulator. The set behavioral model state command is sent by the random test generator 2 via output 6 and received by the simulator 3 via input 7. The initial behavioral model state is sent by the random test generator 2 via output 8 and received by the simulator 3 at input 9. In a step 204, the random test generator 2 saves the current behavioral model state as a pre-simulation behavioral model state. In step 206 of generating a test vector. The test vector is generated based on the current behavioral model state, the architectural model 3, and a random number generator. In addition, if the random number generator 2 accommodates test parameters 12, the test vector may be generated in addition according to the test parameters 12. The random test generator 2 includes a step 208 of simulating the test pattern. To simulate the test pattern, the random test generator 2 sends a simulate command at output 6 and the test pattern at output 8 to the simulator 3. The simulator 3 receives the simulate command at input 7 and test pattern at input 9, and simulates the test pattern according to the behavioral model 5. The simulator 3 then sends the current behavioral model state to the random test generator 2 at output 11 in step 210. In step 212 the random test generator 2 determines from the current behavioral model state whether the test pattern should be kept. If the random test generator 2 determines that the test pattern should not be kept, the test pattern is discarded in step 214 and the current behavioral model state of the simulator 3 is reset to the pre-simulation behavioral model state. Steps 206 through 212 are then repeated. If, however, the random test generator 2 determines that the test pattern should be kept, the random test generator 2 makes a determination in step 216 of whether another test pattern should be generated. This may be determined as instructed by the test parameters 12 or may be embedded within the random test generator 2 itself. If another test pattern is to be generated, steps 204 through 216 are repeated. If another test pattern is not to be generated, the test case including the initial behavioral model state, the sequence of test patterns kept, and the final expected behavioral model state are output in step 218.

Figure 3:
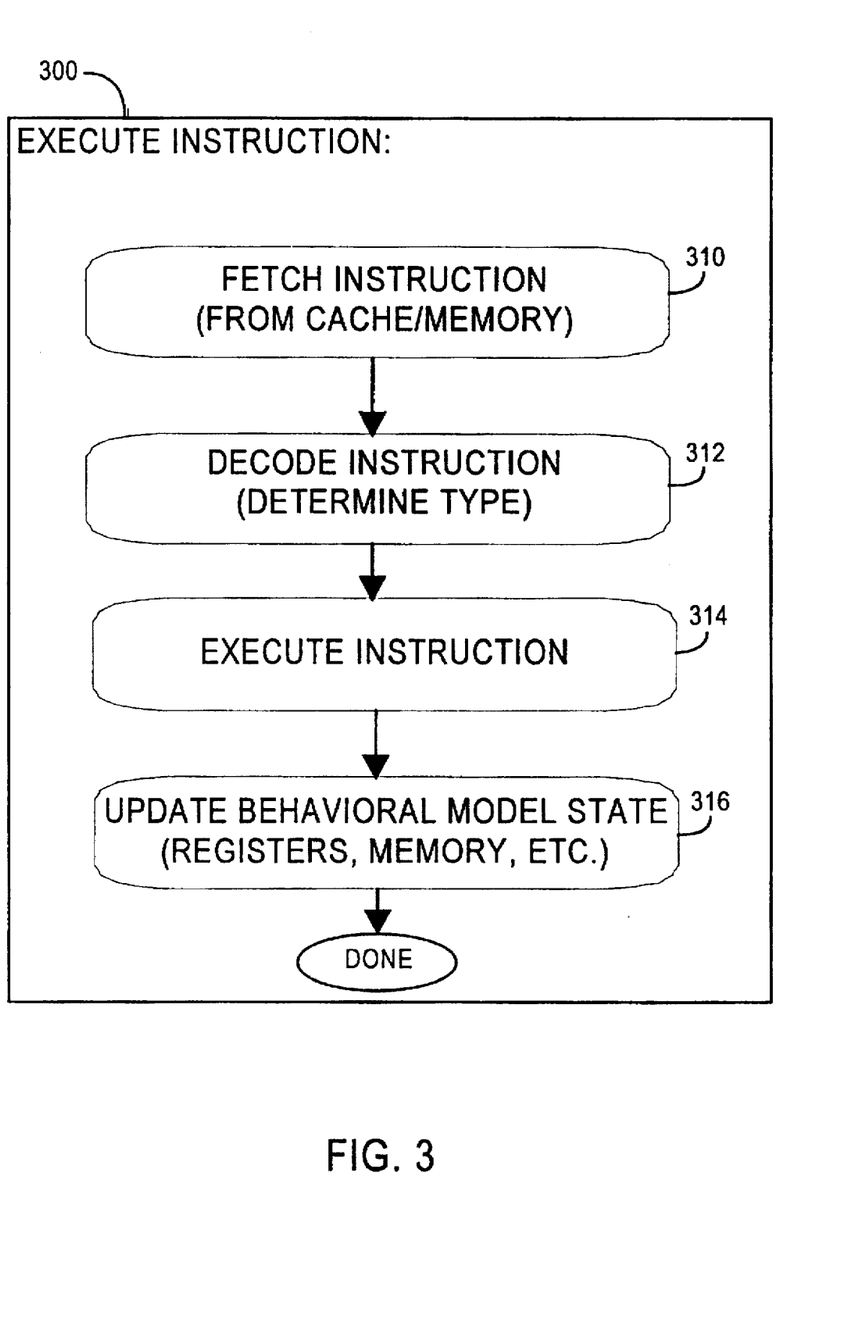
FIG. 3 is a flowchart for the sequence of operations executed by the simulator when it receives a simulate instruction command.

FIG. 3 is a flowchart for the sequence of operations, shown generally at 300, executed by the simulator 3 when it receives a simulate command from the random test generator 2. As shown in FIG. 3, the sequence of operations 300 includes a first step 310 of receiving a test pattern from the random test generator 2. In the preferred embodiment, since the architectural model 4 is a computer architecture, step 310 may result in the fetching of an instruction by the simulator 3. Depending on the architectural model 4 and behavioral model 5, the instruction may be fetched simply from the input 9 or may fetch it from a cache or memory. The operation of the cache or memory may or may not be simulated as well. The sequence of operations 300 executed by the simulator 3 includes a second step 312 of decoding the instruction to determine its type and operands. The sequence of operations 300 includes a third step 314 of executing the instruction according to the behavioral model 5. A fourth step 316 includes updating the behavioral model state. In step 316 simulator 3 also sends the updated behavioral model state to the random test generator 2.

The present invention allows code to be speculatively simulated to see what effect it has. For example, the random test generator might determine that a given instruction will generate an interesting result. The random test generator with integrated simulator and mechanism for storing a pre-simulation state and resetting it later allows the instruction to be speculatively executed to see if the result is indeed interesting. As an example, suppose the random test generator wants to bypass an ADD instruction result to a next load LD instruction. The operation requires the ADD result to be a valid result within certain memory space boundaries. With the present invention, the random test generator can save a pre-simulation behavioral model state, generate an ADD instruction, simulate it, and determine if its result is within the required boundaries. If the multiply result is within the required boundaries, the random test generator may keep the result; if the result does not come within the boundaries, the random test generator can discard the result, reset the behavioral model state to the pre-simulation behavioral model state, and generate another ADD instruction until it gets a desired result.

The utility of the present invention may also be helpful in controlling the rate at which certain events occur. For example, if a test pattern is a branch instruction, information about the branch can be analyzed, including whether the branch was taken and whether it branched forward or backward. The branch test pattern may be accepted or rejected to provide a test case containing an equal number of taken and not-taken branches or so that an equal number of forward and backward branches occur. As another example, a test pattern can be analyzed to see if it caused an interruption to the normal processing of instructions. The random test generator may control the rate at which interruptions occur by rejecting test patterns that either cause too many or too few interruptions.

Another area in which the present invention is particularly useful is in testing architectural violations of speculatively executed instructions in computer architectures that support speculative execution. In such pipelined computer architectures, the computer architecture design may speculatively start execution of instructions before knowing whether or not the execution is supposed to occur. Before an instruction is allowed to change the state of the machine, the computer architecture determines whether the instruction should complete or whether it should be terminated without affecting the machine state. One common case where speculatively executed instructions are terminated is the case of a mispredicted branch instruction. A mispredicted branch occurs when the computer architecture incorrectly predicts that a branch will or will not be taken. The prediction is assumed correct until the computer architecture determines otherwise, and execution of instructions following the assumed target of the branch are speculatively executed until and unless the computer architecture determines that the branch prediction was incorrect. If a mispredicted branch occurs, all speculatively executed instructions after the branch instruction must be discarded. Since the invention allows the inspection of the machine state (i.e., the behavioral model state) following the simulation of a test pattern, it is possible to insert instructions along the path of a branch that is not taken. Since these instructions are required to be terminated before completing, the present invention may be used to create both legal and illegal instructions along this path. Using a variety of instructions creates events that test aspects of the pipeline design.

Another area where instruction execution is speculatively started and then terminated is when an instruction is predicated or nullified. Several computer architectures support the concept of conditional execution of instructions based on the outcome of prior instructions. This concept is generically called predication. When an instruction should not be executed it is said to be nullified. It is common in designs that the determination that an instruction should be nullified occurs after instruction execution has been started. In this case the instruction execution must be terminated and the machine state must be the same as before the instruction was started. With the present invention it is possible to determine when an instruction will be nullified and to generate the next test pattern which would otherwise be illegal but in this case presents no problem since it is to be nullified and the machine should ignore it. The ability to create predication conditions allows more thorough testing of the portion of the design of the computer architecture responsible for nullification.

Another feature that the present invention allows is the ability of machine events to be tracked as the code is produced. Events can be any aspect of a design that is important to test. Examples of useful events to track may include: the number of times each or each type of instruction was executed; whether an ADD test pattern resulted in an overflow; whether a memory load resulted in a protection violation; whether a privileged instruction fault occurred; and whether a branch was taken forward to the last instruction on a page. Tracking of events allows the user to analyze and improve the type of coverage the tests produce. By including a history of events created by past test patterns, test patterns can be "accepted" if they produce a new event or "rejected" if they cause events that have already been tested. In the preferred embodiment, events are stored to a file by piping events to a file using a UNIX socket.

2. Representative Example

An example of the above computer-based test system is given below with reference to FIGS. 4 through 8. The example is presented merely for purposes of illustration of the system and method of the present invention. The invention is not limited in any way by the representative example.

Figure 4:
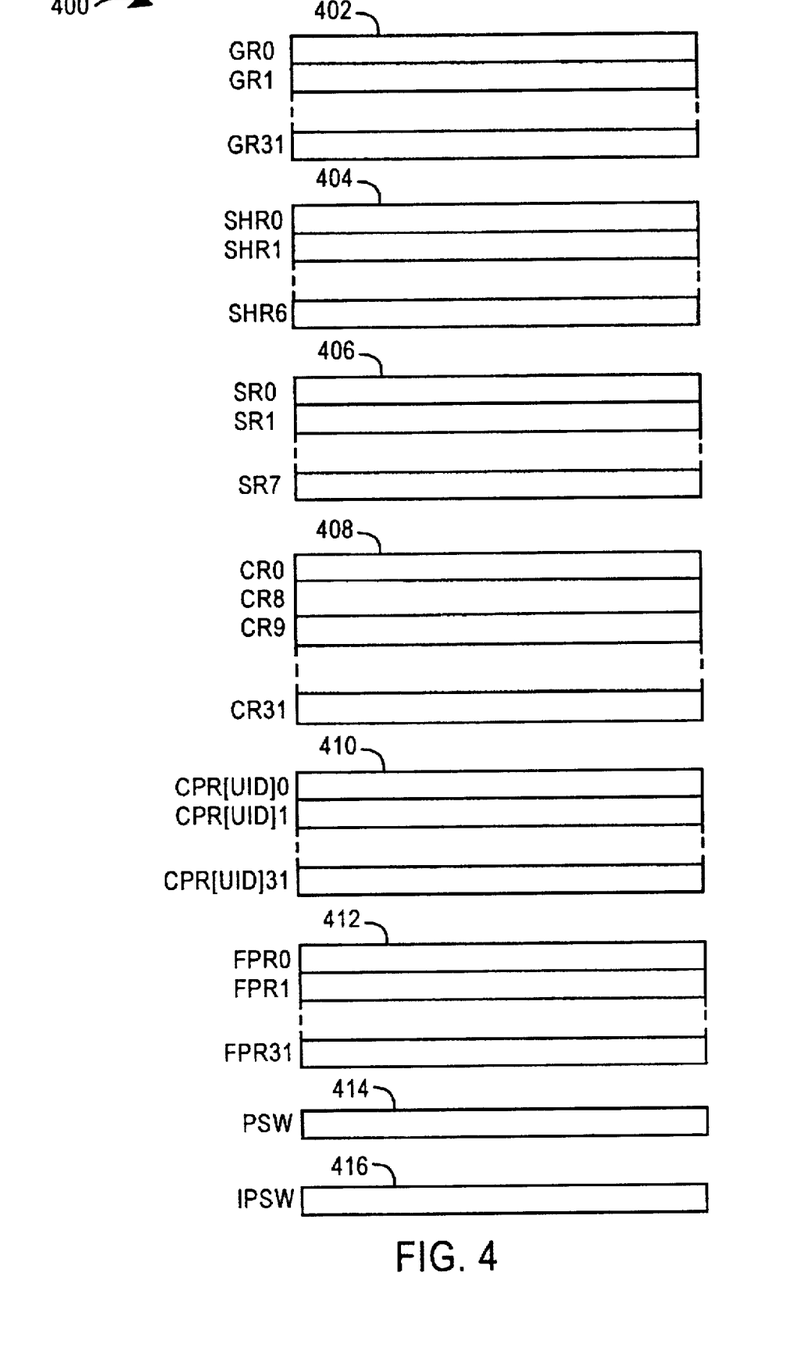
FIG. 4 shows an example architectural model of a computer architecture under test.

FIG. 4 shows an example architectural model 400 of a computer architecture under test. In this example, the architectural model 400 includes thirty-two general registers GR[t]:{t :=0 ... 31} 402, seven shadow registers SHR[t]:{t :=0 ... 6} 404, eight space registers SR[t]:{t =0 ... 7} 406, twenty-five control registers CR[t]:{0, 8 ... 31} 408, thirty-two coprocessor "uid" registers CPR[uid][t]:{8 t:=0 . . 31} 410, thirty-two floating-point coprocessor registers FPR[t]: {t :=0 .. 31} 412, a processor status word PSW 414, and an interruption processor status word IPSW 416.

For illustration, the random test generator 2 of this example can generate three instructions: an add instruction ADD, a store word instruction STW, and a branch instruction COMBT. The ADD instruction takes two registers, adds them, and places the result into a third register. The STW instruction stores a register to an address in memory. The COMBT instruction compares two values and performs a branch conditionally based on the values compared. These instructions are representative of the types of instructions that are used in modern CPU designs, although most CPUs have tens or hundreds of these instructions.

Figure 5:
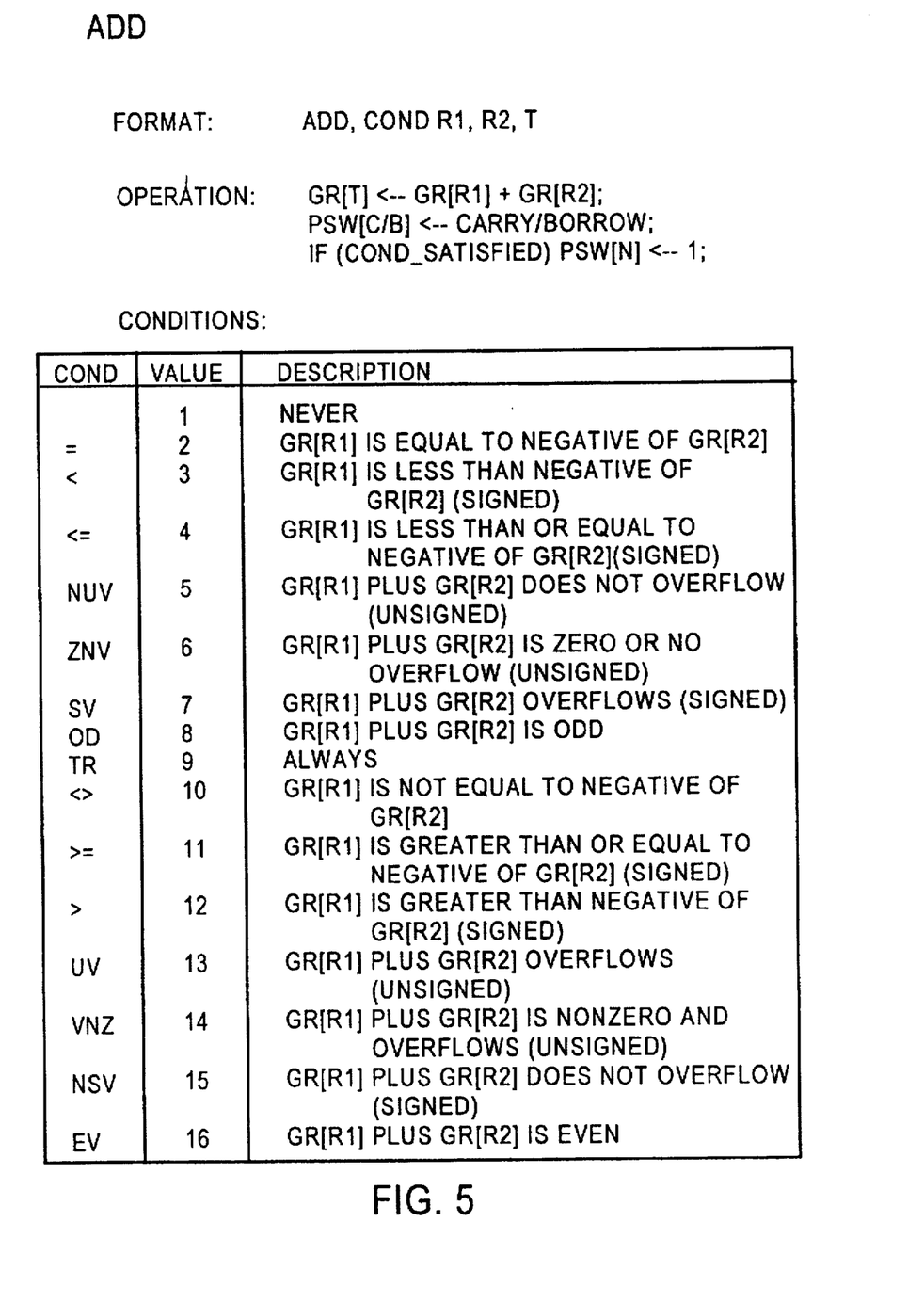
FIG. 5 illustrates a high level behavioral model for an instruction ADD.

FIG. 5 illustrates a high level behavioral model portion for the ADD instruction which is simulated by simulator 3. As shown in FIG. 5, the format of the ADD instruction is ADD, cond r1, r2, t. The values of cond, r1, r2 and t, and hence which general registers are used, are determined by the random test generator 2. The simulator 3 performs the ADD instruction by adding the values in the two general registers selected by r1 and r2, and placing the result in the general register selected by t. Accordingly GR[t] gets GR[r1]+GR[r2]. In addition, the carry/borrow bit of the processor status word PSW is updated to reflect whether the ADD resulted in a carry or borrow. The condition cond specifies one of the conditions shown in FIG. 5. If, after the ADD instruction is completed, the condition is satisfied, the instruction following the ADD instruction is nullified, or ignored. The processor knows to nullify the next instruction if the nullify bit PSW[N] in the processor status word is set. Accordingly, if the condition is satisfied, the processor status word PSW[N] is updated and bit N is set.

Figure 6:
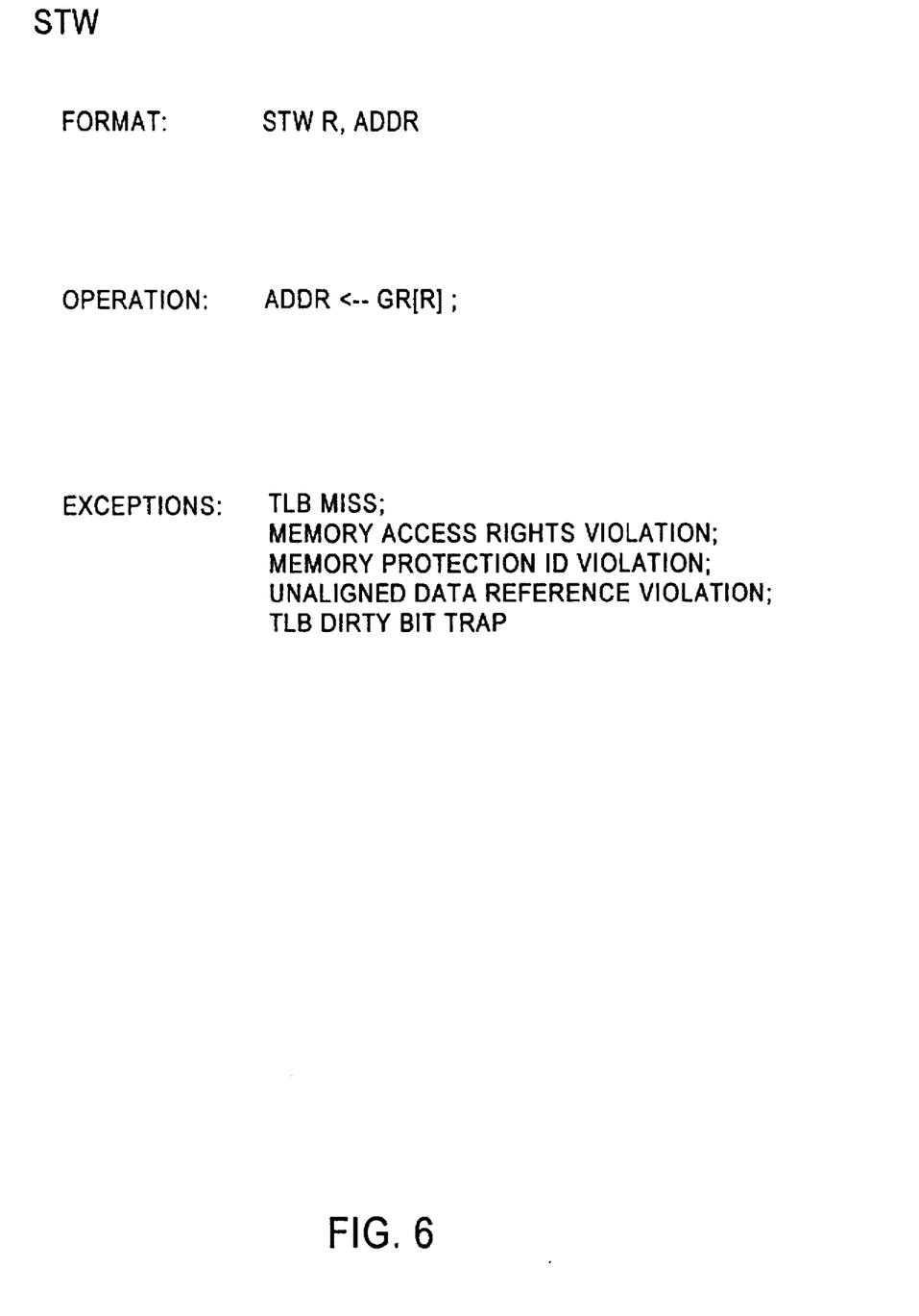
FIG. 6 illustrates a high level behavioral model for a store word instruction STW.

FIG. 6 illustrates a high level behavioral model portion for the STW instruction which is simulated by simulator 3. As shown in FIG. 6, the format of the STW instruction is STW r, addr, where r indicates the general register to be stored, and addr is the memory address where the contents of the general register GR[r] is to be stored. Depending on the type of addressing modes the computer architecture supports, the method of indicating the address addr may vary. For example, in a computer architecture which supports virtual addressing, addr might be divided into separate operands which indicate the base address and the offset address. In the present example, the values of r and addr, and hence which general register and where it is to be stored, are determined by the random test generator 2. The simulator 3 performs the STW instruction by moving a copy of the value in general register GR[r] to a memory location specified by addr. In a more complicated architecture, for example one supporting virtual addressing, the address addr might first be calculated by adding an offset to the contents of a base register. As also shown in FIG. 6, the STW instruction might cause a number of exceptions including a data translation lookaside buffer (TLB) miss, a data memory access rights violation, a data memory protection ID violation, an unaligned data reference violation, or a TLB dirty bit trap.

Figure 7:
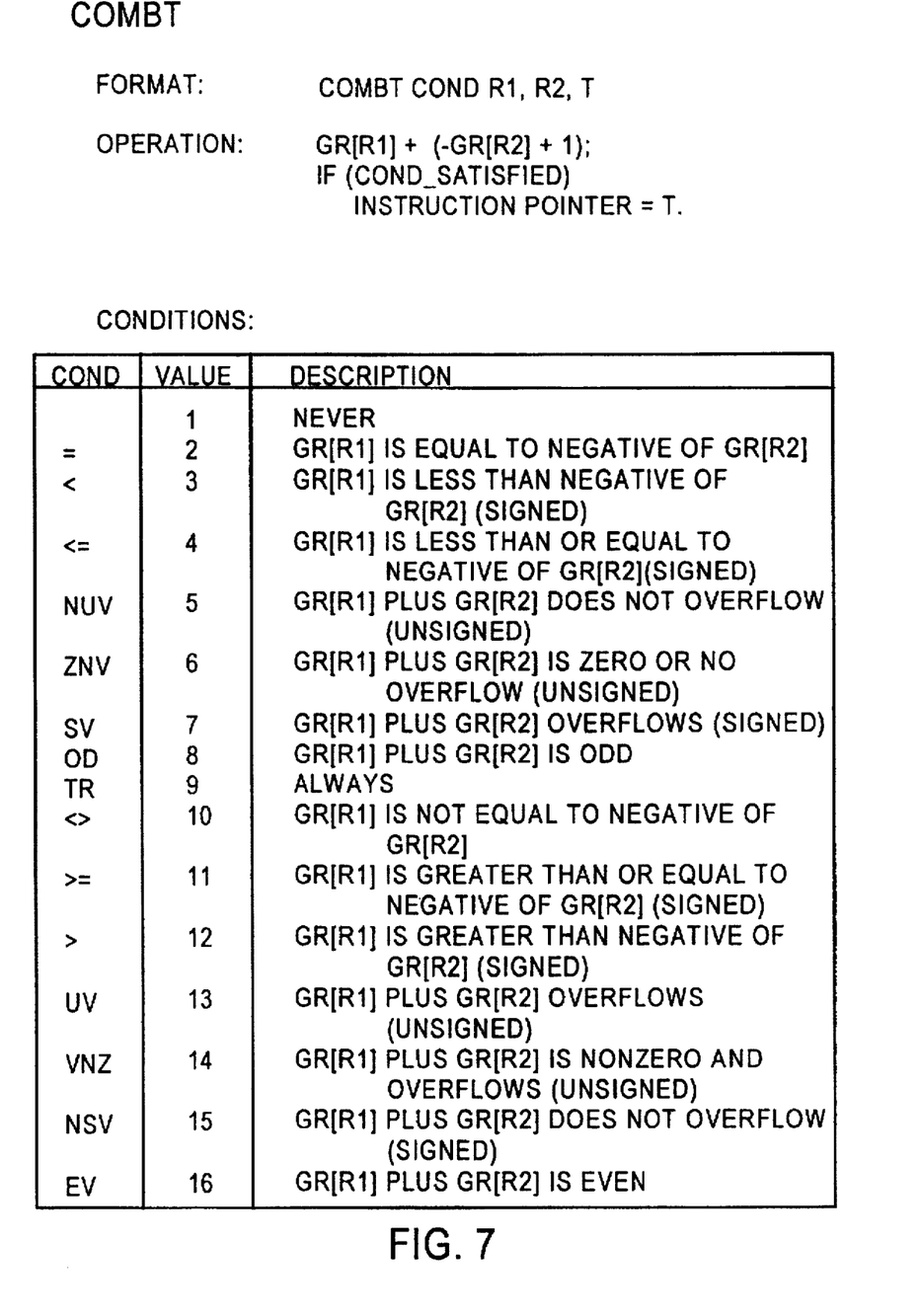
FIG. 7 illustrates a high level behavioral model for a branch instruction COMBT.

FIG. 7 illustrates a high level behavioral model portion for the COMBT instruction which is simulated by simulator 3. As shown in FIG. 7, the format of the COMBT instruction is COMBT cond, n r1, r2, t. The values of r1, r2 and t are determined by the random test generator 2. The simulator 3 performs the COMBT instruction by comparing the values in the two general registers selected by r1 and r2. If the comparison satisfies the condition specified by cond, the simulator 3 branches to the target address specified by t. The condition cond specifies one of the conditions shown in FIG. 7. If the nullify bit n is set, the next instruction gets nullified.

Figure 8:
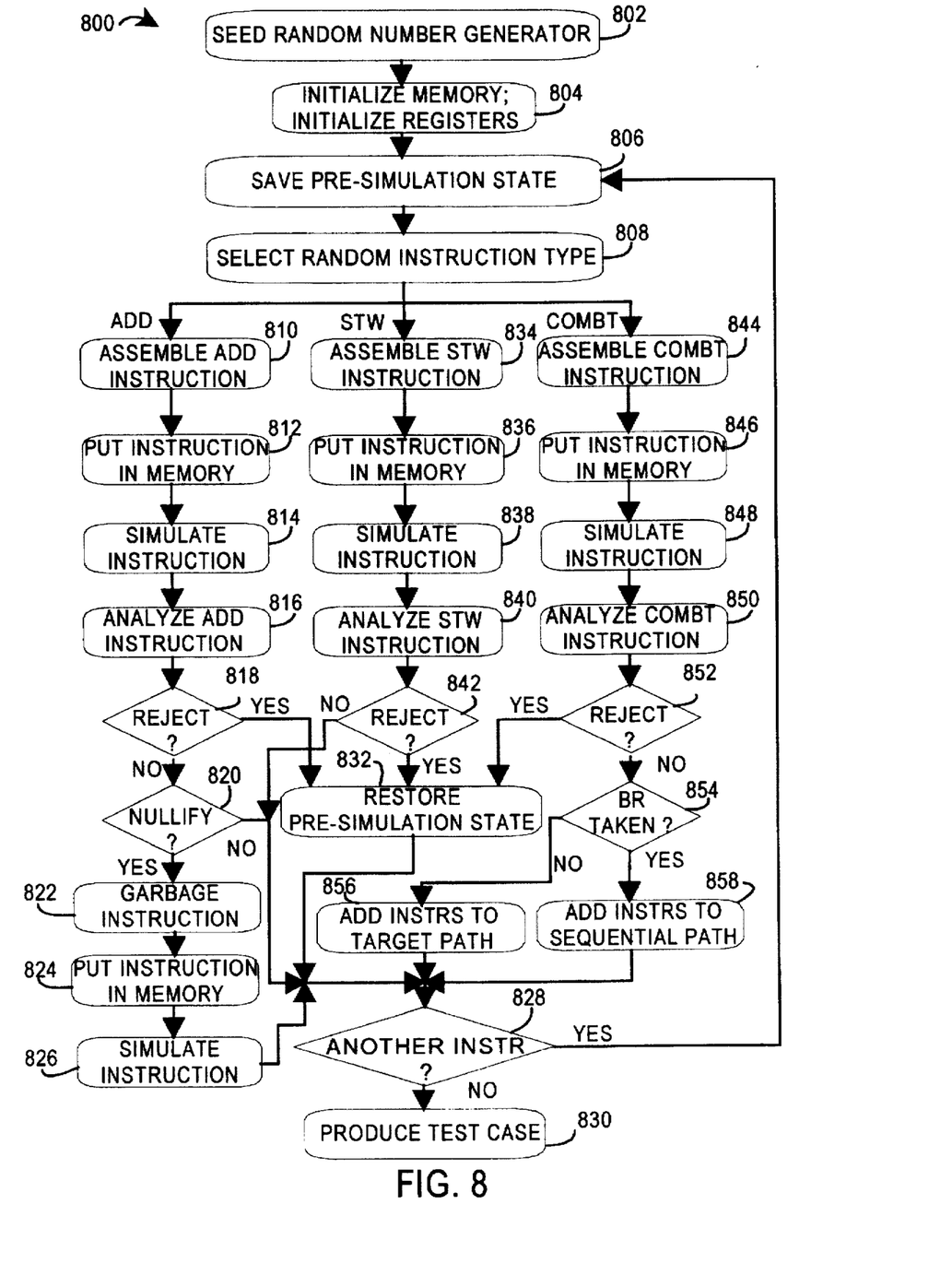
FIG. 8 is a flow diagram of the procedure followed by the random test generator of the present invention in generating a test case.

FIG. 8 is a flow diagram of the procedure 800 followed by the random test generator 2 in generating a test case in this example. As shown in FIG. 8, the random test generator procedure 800 begins a test case with step 802 by seeding a random number generator. Seeding the random number generator with a known value allows the test case to be regenerated in a later run. The random test generator 2 then performs a step 804 of initializing memory and the registers of the behavioral model. The random test generator 2 chooses interesting values for memory locations and registers and for each initial value sends a command to the simulator 3 via control line 13 instructing it to set a memory or register value to the chosen initial values sent on test pattern line 14. Interesting initial memory and register values might include for the present example such values as addresses that could be used by the store-word instruction STW or interesting operands for the add instruction ADD and branch instruction COMBT. An element of randomness may be included in the initialization process so that the initial values vary from test case to test case.

The procedure 800 next includes a step 806 in which the current behavioral model state of the simulator 3 is saved as a pre-simulation state. In step 808 a random instruction type is selected. The selection of the instruction type is based on a random number generated by a random number generator, the legal instruction codes defined by the architectural model 4, and on test parameters 12 input from the user if the random test generator 2 accepts test parameters. For example, a user might request that the test case generate 50% ADD instructions, 25% STW instructions, and 25% COMBT instructions.

When a random instruction type is selected, the random test generator proceeds to build the random instruction. If the selected random instruction type is an ADD instruction, the procedure 800 assembles the ADD instruction in step 810. To assemble the ADD instruction, the random test generator 2 selects appropriate general registers for source registers r1 and r2. In selecting a first source register r1, the random test generator 2 first searches the values of the currently used general registers to see if any are "interesting"; if none of the used general registers contain "interesting" values, a "free" general register will be selected and initialized with an "interesting" value. Whether a value is "interesting" or not is determined by test combination algorithms embedded in the random test generator 2, the architectural model 4, and perhaps the test parameters 12 input by the user. For example, the selection algorithm for first source register r1 might have the capability of trying to choose a source register that has recently been set by a previous instruction to increase the amount of data bypassing to test the data bypassing functionality of the ADD instruction. The selection algorithm of the second source register r2 may be similar to the selection algorithm of first source register r1, or it may include different selection criteria depending on the type of test to be run. A target register t is also selected, again using either a similar or different selection algorithm. In addition, a condition field cond is selected. In the preferred embodiment, the condition field cond is selected by generating a random number between 1 and 16. As mentioned above with respect to the behavioral model of the ADD instruction in FIG. 5, if the result of the ADD instruction satisfies the condition, then the next instruction is nullified or ignored. The ADD instruction is assembled by creating the actual machine instruction representation using the selected registers r1, r2, t and condition field cond. After assembling the instruction, the procedure 800 records the selected instruction in memory during a step 812. The instruction is generally placed into the machine state at a memory location pointed to by the program counter of the computer architecture under test. In a step 814, the instruction is simulated by the simulator 3. This causes the simulator to simulate the operation of the behavioral model 5 during the processing of one instruction, or test pattern. The simulator 3 begins with the current behavioral model state and produces a new behavioral model state according to the behavioral model 5. The procedure 800 then analyzes the results of the test pattern simulation in a step 816 by examining the new behavioral model state. In step 818, the random test generator 2 determines whether the test pattern should be kept or rejected. Reasons for keeping or rejecting the test pattern may include that it resulted in an overflow or that it tests an aspect of the computer architecture previously untested by previously generated test patterns. If the test pattern is to be kept, the random test generator 2 checks if the execution of the instruction caused the nullify bit of the processor status word PSW[N] to be set in a step 820. If the nullify bit PSW[N] is set, a garbage instruction is generated in step 822 and stored in memory in step 824 and simulated in step 826. After the generation and simulation of the garbage instruction in steps 822-826, or if the nullify bit PSW[N] did not get set, the procedure 800 checks in step 828 to see if enough random instructions/test patterns have been generated as specified by the test case. Generally, in the preferred embodiment, the number of instructions generated in a test case may be input by the user via test parameters 12. In the alternative, the number of instructions generated for the test case may be hard-coded in the random test generator 2. In any case, if the test case has not yet produced enough random test patterns, the random test generator 2 proceeds to step 806 and repeats the algorithm until enough instructions have been produced. When enough test patterns have been generated, the test case is generated in step 832 for the user. The test case includes three elements: (1) the initial behavioral model state; (2) the sequence of random test patterns; and (3) the final behavioral model state derived from the simulator after the final instruction has been simulated. The test case is the product of the random test generator 2 and can be used in the verification of a complex design such as a CPU. The test case can either be run on a model or an implementation of the design. Applying many random test cases to a design verifies the correctness of the design. If, however, it is determined in step 818 that the test pattern is not to be kept, the random test generator 2 resets the current behavioral model state to the pre-simulation state in step 832 and then proceeds to step 828.

In the alternative, if the selected random instruction type is a store word STW instruction, the procedure 800 includes a step 834 in which a STW instruction is assembled. To assemble the STW instruction, the random test generator 2 must select a source register r. As with the ADD instruction, the random test generator 2 selects a source register r containing an "interesting" value. The selection criteria is determined by test combination algorithms embedded in the random test generator 2, the architectural model 4, and test parameters 12 input by the user. In addition, an address register must be selected to use in forming the address in which the value in source register r is to be stored. A register that has a value that can be used to form a valid address when combined with a legal displacement is selected. The machine state, or behavioral model state from the simulator 3, is crucial in determining which registers contain acceptable address values. If no registers contain legal address values, a "free" register is selected and initialized with an appropriate value which may be generated by a random number generator. In addition, the random test generator 2 generates a valid displacement value disp. The actual address to which the value in source register r will be stored is formed by adding the displacement disp to the contents of the base address register addr. The actual address is formed by the CPU at execution time. The STW instruction is assembled by creating the actual machine instruction representation using the operands r, addr, and disp. After assembling the instruction, the procedure 800 records the selected instruction in memory during a step 836. In a step 838, the instruction is simulated by the simulator 3. The procedure 800 then analyzes the results of the test pattern simulation in a step 840 by examining the new behavioral model state. In step 842, the random test generator 2 determines whether the test pattern should be kept or rejected. Reasons for keeping or rejecting the test pattern may include whether this is a virtual or real mode store, or whether the test pattern resulted in a TLB miss fault, protection violation, or a cache collision. If the test pattern is not to be kept, the random test generator 2 resets the current behavioral model state to the pre-simulation state in step 832. Then, in step 828 the random test generator 2 checks to see if enough random instructions/test patterns have been generated as specified by the test case. If the test case has not yet produced enough random test patterns, the random test generator 2 proceeds to step 806 and repeats the algorithm until enough instructions have been produced. When enough test patterns have been generated, the test case is generated in step 832 for the user.

Finally, if the selected random instruction type is a branch COMBT instruction, the procedure 800 assembles the COMBT instruction in step 844. To assemble the COMBT instruction, the random test generator 2 selects appropriate general registers for source registers r1 and r2. The COMBT instruction is assembled by creating the actual machine instruction representation using appropriate selected general registers r1, r2, branch target address t and condition field cond. After assembling the instruction, the procedure 800 records the selected instruction in memory during a step 846. In a step 848, the instruction is simulated by the simulator 3. The results of the test pattern simulation are analyzed in a step 850 by examining the new behavioral model state. In step 852, the random test generator 2 determines whether the test pattern should be kept or rejected. Reasons for keeping or rejecting the test pattern may include that it resulted in a taken branch, or that a certain condition was used, or that it tests an aspect of the computer architecture previously untested by previously generated test patterns. If the test pattern is to be kept, the random test generator 2 checks if the execution of the branch resulted in a taken branch in a step 854. If the branch was taken, legal and/or illegal test patterns are added to the instruction path that will not be taken, i.e., the sequential path in step 856. If the branch was not taken, legal and/or illegal test patterns are added to the branch target path in step 858. Then, procedure 800 checks in step 828 to see if enough random instructions/test patterns have been generated as specified by the test case. If the test case has not yet produced enough random test patterns, the random test generator 2 proceeds to step 806 and repeats the algorithm until enough instructions have been produced. When enough test patterns have been generated, the test case is generated in step 832 for the user. If, however, it is determined in step 852 that the test pattern is not to be kept, the random test generator 2 resets the current behavioral model state to the pre-simulation state in step 832 and then proceeds to step 828.

Appendix A contains a pseudo-code implementation of the random test generator of the representative example.

The above described invention improves the percentage of test cases that are effective and thereby improves the performance of a random test generator. While described herein in the context of testing a microprocessor design, the system and method of the invention can be applied to all types of integrated circuit designs. While illustrative and presently preferred embodiments of the invention have been described in detail herein, it is to be understood that the inventive concepts may be otherwise variously embodied and employed and that the appended claims are intended to be construed to include such variations except insofar as limited by the prior art.

APPENDIX A

/* This file contains pseudocode showing the high-level operation of a simple random test generator that demonstrates the invention. The random test generator in this example implements only three instructions - ADD, STW, and COMBT. ADD takes two registers, adds them, and places the result into a third register. STW stores a register to an address in memory. COMBT compares two registers and branches based on a relation between the two. These instructions are representative of the types of instructions

APPENDIX A-continued

```
         that are used in modern CPU designs (although most CPUs have
         tens or hundreds of these instructions. */
   seed_random_number_generator;
   /* Allows cases to be reproducible */
   initialize_memory;
   /* The values initialized in memory which might be interesting
         includes addresses that could be used in the store-word
         instruction STW and interesting operands for the ADD and
         COMBT instructions. An element of randomness is included in
         the initialization process so that the values used will vary
         from case to case. */
   initialize_registers;
   /* Again, interesting values would be initialized into the
         general registers and floating point registers. Some
         registers are left "free" - meaning that they can be filled
         in later when it is known how they will be used. */
   WHILE more random instructions are needed DO
   {
   save_machine_state;
   reject_instr = true;
   /* Variable will be set to false once an acceptable test
         pattern has been generated. */
   type = select_random_instr_type;
   /* The selection of the type of instruction is based on
         random numbers and is also based on input from the user.
         For example, a user might request 50% of the instructions
         to be ADDs, 25% of the instructions to be STWs, and 25%
         to be COMBTs. */
   SWITCH (type)
   {
   CASE ADD:
   instruction = assemble_instr(ADD);
   /* This will assemble the test pattern needed for an ADD
         instruction. It will select appropriate operand and
         result registers as well as the condition that will
         potentially nullify the following instruction. */
   put_instruction_in_memory(instruction);
   /* This places the instruction into the machine state at
         the memory location pointed to by the program
         counter. */
   simulate_instruction;
   /* This simulates the operation of the machine during
         the processing of one instruction. It takes the
         current machine state and produces the new machine
         state as specified by the machine architecture
         specification. */
   reject_instr = analyze_add_instr;
   /* This checks the effects of the ADD instruction that
         was produced. Did it cause an event that didn't
         happen before? Did it produce an overflow? Did it
         test the carry chain path in the ALU differently than
         before? Many things can be checked here to determine
         if this test pattern should be kept or rejected. The
         user has control over whether it should be rejected
         by specifying biases that can be used. */
   /* The ADD instruction has the potential to nullify the
         instr that follows it. By simulating the instructions we
         know whether or not the next instruction is going to be
         nullified. If it is, then produce a garbage instruction
         that should be ignored by the machine. */
   IF (reject_instr is false) AND (next_instr_is_nullified)
   THEN
   {
   instruction = garbage_instr;
   put_instruction_in_memory(instruction);
   simulate_instruction;
   }
   END_IF
   END_CASE;
   CASE STW:
   instruction = assemble_instr(STW);
   /* This will assemble the test pattern needed for an STW
         instruction. It will select appropriate source
         register, address register and displacement. */
   put_instruction_in_memory(instruction);
   simulate_instruction;
   reject_instr = analyze_store_instr;
   /* This checks the effects of the STW instruction. What
         events happened? Was it a virtual or real mode store?
```

APPENDIX A-continued

```
         Did it have a TLB miss fault? A protection fault? Did
         it collide in cache with a previous memory operation?
         Like with the ADD instruction, many things can influence
         whether or not an instruction is kept or rejected and the
         user has control by specifying biases that affect the
         selection. */
   END_CASE;
   CASE COMBT:
   instruction = assemble_instr(COMBT);
   /* This will assemble the test pattern needed for a
         COMBT instruction. It will select two registers to
         be compared, select the relation used for the
         compare, and select the appropriate branch target in
         case the branch is taken. */
   put_instruction_in_memory(instruction);
   simulate_instruction;
   reject_instr = analyze_branch_instr;
   /* This checks the effects of the COMBT instruction.
         Was the branch taken? What condition was used? Was
         the branch displacement forward or backward? Was the
         branch target near the end of a page? As before,
         many things influence the decision to reject a branch
         instruction. The user has control over the selection
         process. */
   IF (reject_instr is false) THEN
   {
   /* Put both legal and illegal instructions on the path of
         the branch that isn't selected. This tests out portions
         of a design that must deal with branch misprediction. */
   IF branch is taken THEN
         put_various_instrs_on_sequential_path;
   ELSE
         put_various_instrs_on_branch_target_path;
   END_IF
   }
   END_IF
   END_CASE;
   END_SWITCH;
   IF (reject_instr is true) THEN
   restore_previous_machine_state;
   /* If this test pattern is going to be thrown away we must
         restore the previous state of the machine before
         producing a replacement instruction. */
   END_IF
   }
   END_WHILE;
   produce_test_case;
   /* This step occurs when the random test generator has finished
         producing instructions. It packages up a test case which
         consists of three things: (1) the initial machine state; (2)
         the sequence of random instructions; and (3) the final
         machine state (derived from the simulator when everything
         has been simulated). The test case is the product of the
         random test generator and can be used in the verification of
         a complex design such as a CPU. The test case can either be
         run on a model of the design or it can be run on an
         implementation of the design. Applying many random test
         cases to a design tests the correctness of the design. */
```

What is claimed is:

1. A computer-based test system for generating and improving the effectiveness of test cases for a model or an implementation of a computer architecture, comprising:

an architectural model configured to model the requirements of the computer architecture;

a behavioral model configured to model the implementation of the computer architecture, the behavioral model designed to conform with the computer architecture;

a simulator configured to simulate the operation of the behavioral model in response to a test pattern and to provide a behavioral model state;

a random test generator configured to test aspects of the architectural model and to generate and provide the test pattern to the simulator according to the behavioral model state provided by the simulator, wherein said random test generator includes the ability to store a pre-simulation behavioral model state and reset said simulator to said pre-simulation behavioral model state at a later time;

whereby the random test generator has the ability to set an initial behavioral model state, control execution of the simulator, and produce a test case comprising an initial behavioral model state, a sequence of test patterns, and an expected final behavioral model state.

2. The computer-based test system of claim 1, said random test generator further comprising means for storing a history of previous events.

3. The computer-based test system of claim 2, wherein said random test generator analyzes said history of previous events to control the rate at which an event occurs.

4. The computer-based test system of claim 1, whereby the random test generator stores a pre-simulation behavioral model state, generates a plurality of speculative test patterns, causes the plurality of speculative test patterns to be simulated by the simulator, and, based on the resulting behavioral model state, uses the speculative test patterns in a test case or discards the speculative test patterns and resets the behavioral model state to the pre-simulation behavioral model state.

5. The computer-based test system of claim 4, wherein the random test generator speculatively generates a branch instruction and accepts or rejects said branch instruction based on whether the branch was taken or not-taken after simulation.

6. The computer-based test system of claim 5, wherein if the random test generator accepts said speculatively generated branch instruction, said random test generator generates and inserts a plurality of opposite branch test patterns into an opposite branch instruction path, said opposite branch instruction path being a not-taken path if the branch was taken and being a taken path if the branch was not-taken.

7. The computer-based test system of claim 4, wherein the random test generator speculatively generates a test pattern and accepts or rejects said test pattern based on whether it generated a given interrupt occurs.

8. The computer-based test system of claim 4, wherein the random test generator speculatively generates a test pattern and accepts or rejects said test pattern based on whether it generated a nullify condition.

9. The computer-based test system of claim 8, wherein if the random test generator accepts said speculatively generated test pattern, said random test generator generates and inserts a garbage test pattern following said speculatively generated test pattern.

10. A method for generating and improving the effectiveness of a test case for a model or an implementation of a computer architecture, the model or implementation being modeled by a behavioral model and the computer architecture being modeled by an architectural model, the running and generating a test case being performed by a random test generator having an integrated simulator, wherein the random test generator generates test patterns based on the architectural model and a current behavioral model state and the integrated simulator simulates the behavioral model based on received test patterns to produce the current behavioral model state, the method comprising the steps of:

(1) determining an initial behavioral model state and setting the current behavioral model state to the initial behavioral model state;

(2) saving a pre-simulation state;

(3) generating a test pattern based on the current behavioral model state;

(4) causing the integrated simulator to simulate the test pattern and update the current behavioral model state according to the test pattern and the behavioral model;

(5) analyzing the current behavioral model state to determine whether to accept or to reject the test pattern;

(6) resetting the current behavioral model state to the pre-simulation state if the test pattern was to be rejected;

(7) repeating steps (2) through (6) until a predetermined number of test patterns are generated; and (8) generating a test case comprising the initial behavioral model state, a sequence of each test pattern generated and accepted, and a final behavioral model state.

* * * * *